Nov. 24, 1931.     C. G. OLSON     1,833,227
METHOD OF FORMING TEETH IN GEAR BLANKS
Original Filed March 25, 1927    2 Sheets-Sheet 1
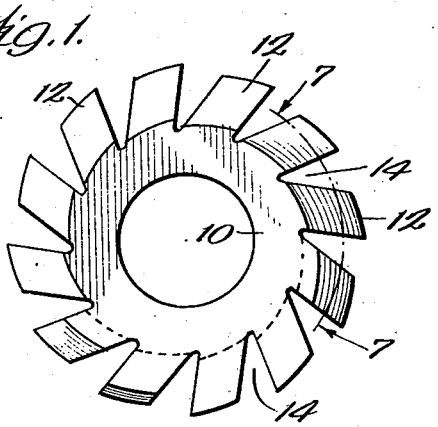
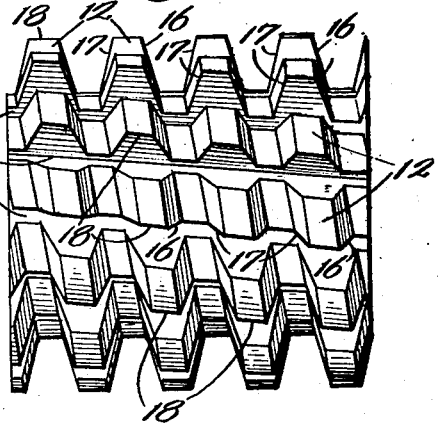
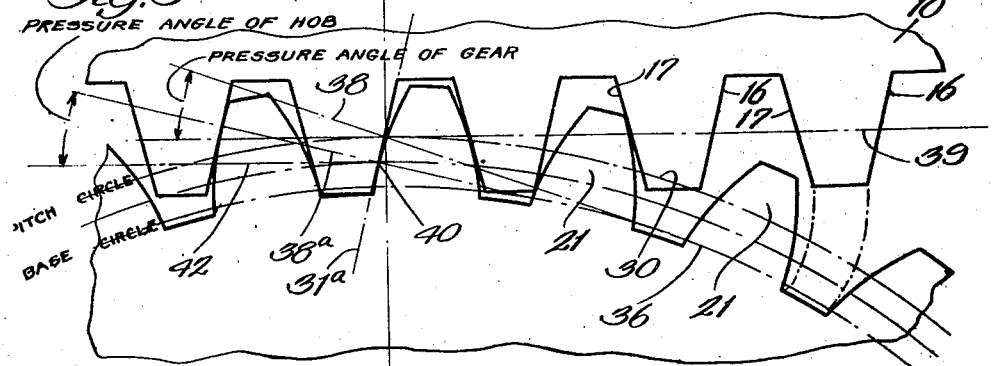
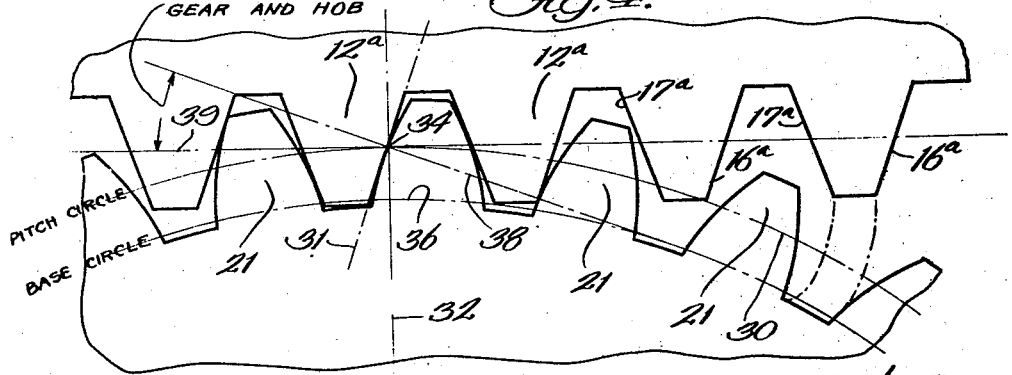

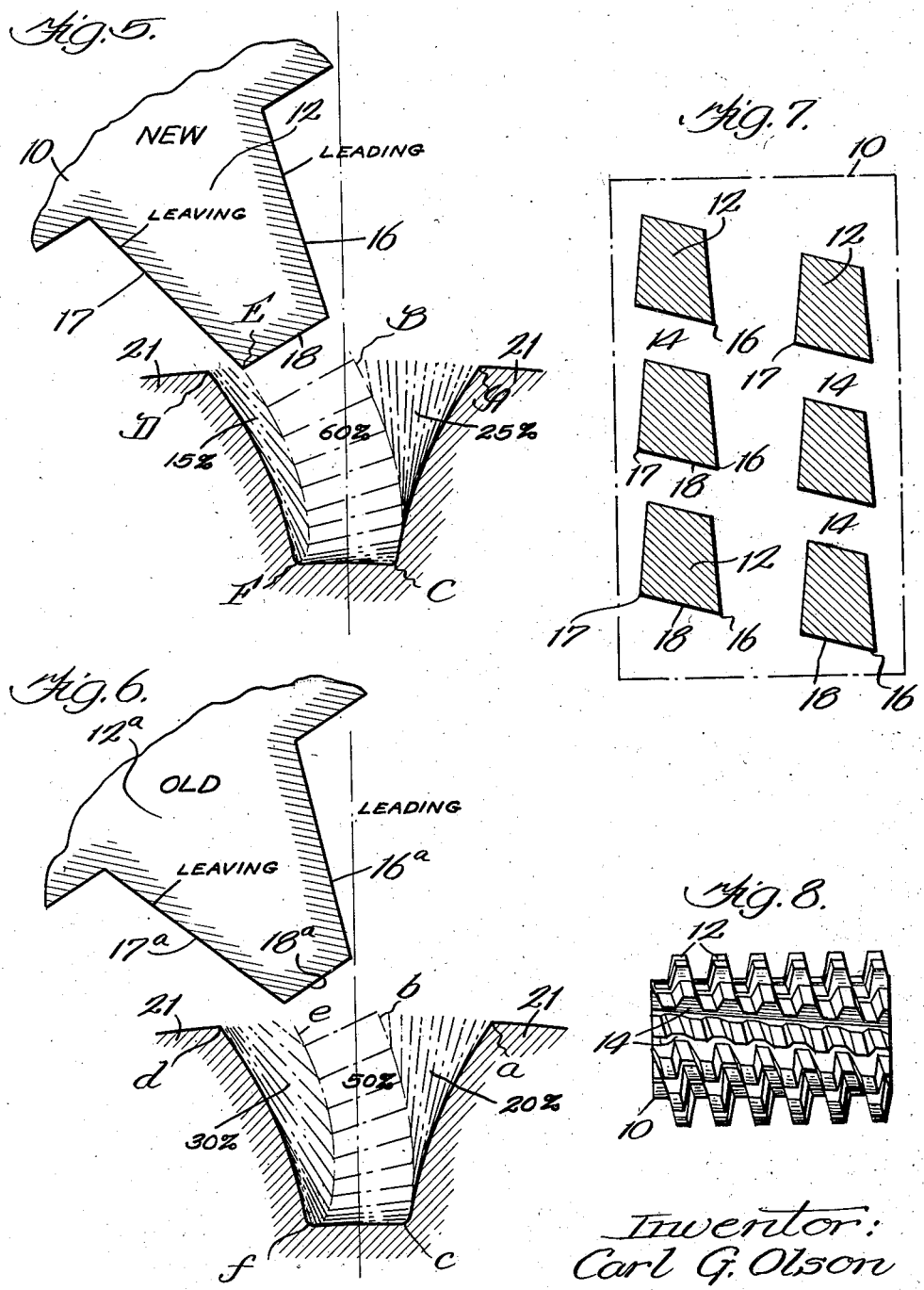

Patented Nov. 24, 1931

1,833,227

UNITED STATES PATENT OFFICE

CARL G. OLSON, OF CHICAGO, ILLINOIS, ASSIGNOR TO ILLINOIS TOOL WORKS, OF CHICAGO, ILLINOIS, A CORPORATION OF ILLINOIS

METHOD OF FORMING TEETH IN GEAR BLANKS

Original application filed March 25, 1927, Serial No. 178,248. Divided and this application filed January 11, 1930. Serial No. 420,217.

My present invention relates to improvements in methods of cutting teeth in gear blanks and this application is a division of my copending application which relates to improvements in hobs, Serial No. 178,248, filed March 25, 1927.

It is one of the primary objects of my present invention to provide an improved practical and simple method whereby involute teeth may be cut in gear blanks in a very expeditious manner and to this end I propose to practice a method wherein a rotating gear blank may be engaged by a cutting edge which is angularly disposed with respect to the gear blank so as to facilitate the cutting of the gear teeth.

Another and more specific object of my invention is to provide an improved method for cutting involute gear teeth wherein the marginal portions of a rotating gear blank may be successively engaged by cutting edges, one of which leads the other in its cutting action and is also capable of removing more stock.

These and numerous other objects and advantages will be more apparent from the following detailed description when considered in connection with the accompanying drawings, wherein:

Figure 1 is an end view of a hob which is representative of a cutting tool by means of which my improved method of cutting involute gear teeth may be effectively practiced;

Figure 2 is a side view of said hob;

Figure 3 is a diagram on an increased scale showing an outline of teeth of a gear and the teeth of the hob shown in Figures 1 and 2;

Figure 4 is a diagram analogous to Figure 3 showing the same gear teeth in cooperative relation with teeth of an ordinary cutter or hob, this view being shown to more clearly set forth the manner in which my improved method of cutting gear teeth differs from methods which have heretofore been praticed;

Figure 5 is a diagram showing an outline or profile of a tooth of the hob shown in Figures 1 to 3 inclusive to more clearly set forth the teachings of the present invention;

Figure 6 is a diagram analogous to Figure 5 and discloses an outline of an ordinary hob tooth and the manner in which it generates teeth of substantially the same size and shape;

Figure 7 is a sectional view on the curved line 7—7 of Figure 1, the scale however being enlarged; and Figure 8 is similar to Figure 2 on a decreased scale but showing a double thread hob instead of one having a single thread.

Referring now to the drawings more in detail wherein like numerals have been employed to designate similar parts throughout the various views, it is to be noted that for the purpose of illustrating one practical application of my invention, I have shown a hob or cutter by means of which my improved method of gear teeth cutting may be practiced. This hob has a body 10 with teeth 12 arranged helically in accordance with the general principles of a hob. In Figure 2 I have shown a single thread hob, although the same principles apply to a double thread hob as shown in Figure 8. The drawings illustrate right hand hobs, that is, one in which the helix progresses from the right end to the left end when the hob is viewed from the side where the cutting edges face downward. The gashes 14, while extending approximately transversely of the thread helix of the hob, extend helically and in a right-hand direction. The result is that the teeth are rendered more acute at the leading edge 16 (see especially Figure 7) with a corresponding decrease in the acuteness of the leaving edge 17. In fact the leaving edge becomes an obtuse angle. The effect produced upon the top cutting edge 18 is to give to it an obliquity with respect to the direction in which it moves in cutting, with the result that it will take a shearing cut.

In my hob the teeth are also undercut, by which I mean, as stated, that if a radial line be dropped from the top of the hob tooth at the forward edge, the front face of the tooth will slant backward from this line. This produces what is termed "hook" and promotes the ease with which the metal in the gear blank may be cut. This undercutting also results in an increase in the acuteness of the top cutting edge 18, as previously mentioned.

From the foregoing it will be evident that by running the gashes along a helix of the same hand lead as the thread helix, the leading edge of the hob teeth has been made sharper, that is, rendered more acute, but at the expense of the leaving edge 17. To consider now the manner in which I have compensated for this reference should be had to the diagrams, particularly Figures 5 and 6. In the ordinary hob, whose action is illustrated in Figure 6, the leaving edge 17a removes a greater volume of metal from the gear blank than does the leading edge 16a. Ordinarily the ratio is, roughly speaking, in the proportion of 30% to 20%, the remaining 50% being removed by the cutting edge 18a at the top of the tooth. This is roughly illustrated in Figure 6 wherein 21 represents the gear blank and 12a the tooth of an ordinary hob. The zone of action of the leading edge is represented by the area a, b, c while the zone of action of the leaving edge 17a is represented by the area, d, e, f. The zone of action of the cutting edge 18a at the top of the hob tooth is represented by the area e, b, c, f. It will be understood that the diagram is not offered as mathematically accurate, but as illustrative, and it will also be understood that these proportions will vary slightly under different conditions, for example, the volumes removed by the different cutting edges will be different where the gear is designed on a 14½° pressure angle than where the gear is designed on a 20° pressure angle. The fact remains, however, that in practicing conventional methods with the ordinary hob, the leaving cutting edge is required to remove a considerable proportion of the total amount to be removed, and in practicing my improved method, the amount of stock required to be removed by the leaving edge is much reduced.

Referring now for comparison to the diagram of Figure 5 in which the principle of action of my hob is illustrated, the leading edge 16 removes metal from the zone A, B, C while the volume which must be removed by the leaving edge 17 is represented by the area D, E, F. The volume removed by the top cutting edge 18 is represented by the area E, B, C, F. Roughly speaking, for hobs designed to produce involute gear teeth based on a 20° pressure angle the volume of metal removed by the leading edge of my hob will be ordinarily in the neighborhood of 25% of the whole, and of the top cutting edge about 50% of the whole, and of the leaving edge about 15%. As in the previous instance, however, these percentages are not offered as being accurate but rather as being illustrative, and the same is true of the diagram itself.

Now to explain the difference in the two hobs of Figures 5 and 6 and the methods capable of being practiced thereby more from the theoretical viewpoint, attention is directed to Figures 3 and 4, which are also diagrammatic and show respectively the new and the ordinary hob. In these two views the gear teeth 21 are identical. The pitch circle of the gear teeth is represented by the arc 30, and the pressure tangent by the line 31 which may be assumed to be at an angle of 20° from the radius 32 which passes through the pressure point 34, that is, the point where the pressure tangent intersects the pitch circle. The base circle 36 from which the gear tooth is generated is of course derived by erecting a perpendicular 38 to the pressure tangent 31 at the pitch point 34. Line 38 will be referred to as the pressure line and the angle between this and the pitch line tangent 39 of the gear will, of course, represent the pressure angle. In the ordinary hob, which Figure 4 represents, the side of the adjacent hob tooth is made to conform (allowance being made for clearance of course) to the pressure tangent 31. Thus the hob teeth will have the same pressure angle as the teeth of the gear to be cut.

Now referring for comparison to Figure 3, which is a diagram illustrating the action of my improved hob, the gear teeth 21 are the same as in Figure 4, and the same is true of the pitch circle 30, pressure line 38 of the gear teeth and gear tooth tangent 39. But for my hob I make the side of the hob tooth conform to a pressure tangent 31a which is tangent to the side of the gear tooth at a point 40 lower down on the gear tooth. Thus it will be evident that the teeth of my new hob will have sides which are more nearly perpendicular to the hob axis, and are thinner at the base and thicker at the top than the teeth of the ordinary hob shown in Figure 4. A perpendicular 38a erected upon a line 31a at the point 40 will lie more nearly parallel with the pitch line 42 of the hob than will line 38 relatively to the pitch line tangent 39 of the gear. Thus, in my hob the pressure angle is smaller and the pitch line 42 of the hob is not coincident with the pitch line tangent 39 of the gear. Incidentally it may be stated that in my hob the lead is somewhat shorter than in the ordinary hob.

The hob shown in Figure 8 is made in accordance with the principles above described, but has a double thread, that is, having two starts of thread, which is found to be desirable, especially in connection with roughing hobs.

From the foregoing it will be seen that my hob in its preferred form has two cutting edges which are definitely acute, but that while this acuteness is obtained at the expense of the third cutting edge, which becomes obtuse, this objection is more than offset by the improved action of the other two cutting edges and the fact that the teeth are modified in such a way as to require the acute cutting edges to remove the greater bulk of the material and assume a considerable amount of the burden usually carried by the leaving side, which is now rendered obtuse. The efficiency is also enhanced by the fact that the acute cutting edges take a shearing cut. I have found by test that production in cutting gears with these hobs has been raised about 50% over the production obtained when ordinary hobs are used. The improvement becomes very important when cutting gear teeth of large pitches where the bulk of the material is removed by a roughing operation, for which this hob is far superior to the ordinary roughing hob.

From the foregoing it will be understood that in practicing my improved method of cutting gears, the gear blank is rotated and a series of cutting edges are successively brought into engagement with the marginal portion thereof. These series of cutting edges are arranged in pairs as clearly set forth above in describing the specific hob construction by means of which my method may be practiced. Each pair of cutting edges, namely edges 16 and 17, are inclined toward each other, and the angle included between said edges is less than twice the pressure angle of the gear to be cut. This is clearly evident from the diagram shown in Figure 3 wherein the angle formed by the pressure tangent 31a and an imaginary line forming the extension of the opposite side of the hob tooth is less than the angle which would be included between companion pressure tangents of the gear teeth. In other words, by referring specifically to the hob, it may be said that the pressure angle of the hob teeth is less than the pressure angle of the gear teeth which are cut.

Having thus described my invention, what I claim as new and desire to secure by Letters Patent is:

1. The method of forming involute teeth in gear blanks which consists in rotating the gear blank and successively engaging the marginal portion of the blank with pairs of cutting edges, one of the edges in each pair leading the other in its cutting action, said cutting action being such as to remove more stock by the leading cutting edges of each pair than the other edges.

2. The method of forming involute teeth in gear blanks which consists in rotating the gear blank, moving pairs of cutting edges about a common axis, one of the cutting edges in each pair leading the other, and successively engaging the marginal portions of the blank with said pairs of cutting edges so as to remove more stock by the leading cutting edges than the other edges.

3. The method of forming involute gear teeth in gear blanks which consists in rotating the gear blank and successively engaging the marginal portion of said blank with pairs of angularly disposed edges, the angle included between the cutting edges constituting each pair being less than twice the pressure angle of the gear teeth to be cut.

4. The method of forming involute teeth in gear blanks which consists in rotating the gear blank and successively engaging the marginal portion of said blank with pairs of cutting edges, one of the edges in each pair constituting a leading edge which is sharper than the other edge, whereby stock may be more readily removed by said leading edges than by the other edges.

5. The method of forming involute teeth in gear blanks which consists in rotating the gear blank and successively engaging the marginal portion of said blank with pairs of angularly disposed cutting edges, the angle included between the cutting edges of each pair being less than twice the pressure angle of the gear to be cut, one of the cutting edges in each pair being sharper than its companion edge and leading the same in its cutting action, whereby stock may be more readily removed by the leading cutting edges than the other cutting edges.

6. The method of forming involute teeth in gear blanks which consists in rotating the gear blank and successively engaging the marginal portion of the blank with pairs of cutting edges, one of which leads the other in cutting, said cutting action being in conformity with the molding generating action of a rack having a pitch to conform with a generating circle of smaller diameter than the pitch circle in the gear to be cut, whereby the material to be removed in the gear blank is more unevenly distributed between the cutting edges, and employing one of the edges in each pair to remove a greater portion of the stock, said edge being sharper than the other companion edge to facilitate compliance with this requirement.

7. The method of forming involute teeth in gear blanks which consists in rotating the blank and successively engaging the marginal portion of said blank with pairs of cutting edges rotating in unison with each other about a common axis, the cutting edges of the pair, when viewed in diametral section, being oblique with reference to each other and the included angle being less than twice the pressure angle of the gear to be cut, the included angle at the front of the leading cutting edge, when considered in coaxial cylindrical section, being an acute angle and the included angle at the front of the leaving edge being greater than at the leading edge.

8. The method of forming involute teeth in gear blanks which consists in rotating the blank and successively engaging the marginal portion of said blank with pairs of cutting edges rotating in unison with each other about a common axis, the cutting edges of the pair, when viewed in diametral section, being oblique with reference to each other and the included angle being less than twice the pressure angle of the gear to be cut, the included angle at the front of the leading cutting edge, when considered in coaxial cylindrical section, being an acute angle and the included angle at the front of the leaving edge being an obtuse angle.

9. The method of cutting a gear which consists in employing a hob provided with cutting teeth arranged in a thread, the sides of said teeth having a slope of such steepness as to cause them to generate on a circle of smaller diameter than the diameter of the pitch circle of the gear to be cut, rotating the hob on its axis, and causing the teeth thereof to successively engage the margin of a gear blank.

In witness whereof, I have hereunto subscribed my name.

CARL G. OLSON.